(No Model.)
G. JOHNSTON.
LENS TESTER.
No. 337,333. Patented Mar. 2, 1886.
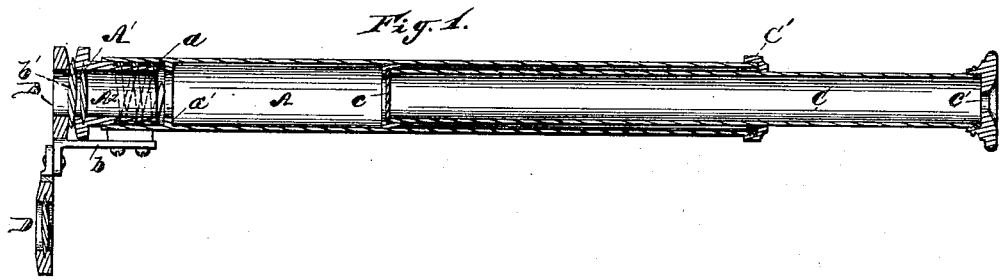
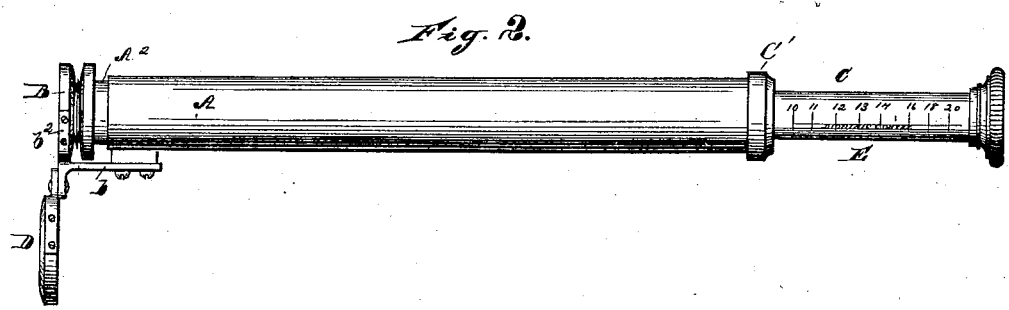
WITNESSES
Jno. E. Wiles.
Samuel E. Thomas
INVENTOR
George Johnston
By W. W. Seggers
Attorney

UNITED STATES PATENT OFFICE.

GEORGE JOHNSTON, OF DETROIT, MICHIGAN.

LENS-TESTER.

SPECIFICATION forming part of Letters Patent No. 337,333, dated March 2, 1886.

Application filed October 3, 1885. Serial No. 178,929. (No model.)

*To all whom it may concern:*

Be it known that I, GEORGE JOHNSTON, of Detroit, county of Wayne, State of Michigan, have invented a new and useful Improvement in Lens-Testers; and I declare the following to be a full, clear, and exact description of the same, such as will enable others skilled in the art to which it pertains to make and use it, reference being had to the accompanying drawings, which form a part of this specification.

My invention relates to an improved lens-tester for determining accurately and readily the refraction or power of lenses, and more particularly of spectacle or eyeglass lenses of different varieties; and it consists of the combinations of devices and appliances hereinafter specified, and more particularly pointed out in the claims.

In the drawings, Figure 1 is a longitudinal sectional view of a device embodying my invention. Fig. 2 is a side elevation showing one of the scales. Fig. 3 is a similar view showing the opposite scale.

Various circumstances arise in which it becomes desirable and necessary to determine the strength and the proper number of lenses—as, for instance, should the lens in a pair of glasses become broken or the number be lost in the hands of the dealer. In these circumstances of course the manufacturer can easily determine the matter; but a simple and convenient instrument is desirable by which any person who may have occasion can test the power of a lens and ascertain its exact strength.

My invention is designed to supply an instrument for making such a test, and is carried out, essentially, in the following manner.

Referring to the drawings, A represents a tube provided with a suitable lens, A', preferably having a yielding engagement therewith. This engagement is secured by mounting the lens A' in a separate lens-tube, A², telescoped into the tube A, said lens-tube being cut away on its outer periphery to admit a spring, $a$, to encircle said end, the inner end of said spring seated upon a shoulder or stop, $a'$, in the tube A, so that the lens-tube may be forced inward a slight distance and be retracted by the spring. The tube A is also provided at the end adjacent to the lens A' with a perforated lens-holder, B, secured in place in any proper manner, as by an arm, $b$, removably secured upon the tube. By depressing the lens or forcing it inward the lens $b'$ to be tested may be inserted between the lens A' and the lens-holder B, when the spring will retract the lens-tube and hold the lens to be tested between the lens A' and the holder B while it is being tested.

C is the eye-tube telescoped into the tube A and provided with a ground glass, $c$, at its inner end, upon which to focus the rays transmitted through the lens A'. Said tube is also preferably provided at its outer end with a plain glass, $c'$, simply to close the aperture of the tube to keep out dust, &c. For testing convex lenses this is all the mechanism required; but for testing concave lenses it is necessary to provide an additional lens, D, which may be pivotally engaged upon the arm $b$ or its clasps $b^2$, which engages and supports the lens-holder B. By pivotally engaging the lens D thereon in this manner it may be readily thrown in place for testing concave lenses and turned out of the way for testing convex lenses. The lenses A' and D should each be convex lenses. The lens-tube A², it is evident, will be held from displacement in the tube A by the lens-seat B. The eye-tube is also prevented from dislocation in the tube A by means of the nut C'. The eye-tube is provided with two scales, E and E', graduated in opposite directions, for indicating the focal distance of either concave or convex lenses, as the case may be.

The operation of the device will now be understood. The lens to be tested being secured between the lens A' and the holder B, as described, the eye-tube is raised to the eye and adjusted in the tube A until the lens is clearly focused upon the ground glass $c$, when the point of adjustment will be indicated by the proper scale and determine the power of the lens. The dioptric or ordinary linear scale may be used.

The arrangement of the scales will of course be determined by the power of the lens A'. I do not confine myself to the use of the lens-holder herein described to assist in holding the lens, as the lens to be tested may be supported before the lens A' in any suitable manner.

What I claim is—

1. The combination of the tube A, having a lens-holder, B, a yielding lens-tube, A², inserted in one end of said tube and carrying a lens, A', and a tube, C, telescoped in the opposite end of the tube A and provided with a glass, c, and one or more graduated scales, substantially as described.

2. The combination of the tube A, having an interior stop, a', and an outer arm, b, the lens-tube A², carrying a lens, A', the spring a, surrounding the inner end of said lens-tube and bearing against the stop a', the lens-holder B, mounted on the arm b, and the graduated telescopic tube C, having a glass, c, substantially as described.

3. The combination of the tube A, having a fixed lens-holder, B, and a pivoted lens-holder, D, the yielding lens-tube A², carrying a lens, A', and the telescopic tube C, provided with a glass, c, and one or more graduated scales, substantially as described.

In testimony whereof I sign this specification in the presence of two witnesses.

GEORGE JOHNSTON.

Witnesses:
M. B. O'DOGHERTY,
A. E. INGLIS.